(12) United States Patent
Yang et al.

(10) Patent No.: US 10,243,798 B2
(45) Date of Patent: Mar. 26, 2019

(54) VARIABLE SNMP DATA COLLECTION WITH EMBEDDED QUERIES

(71) Applicant: CA, Inc., New York, NY (US)

(72) Inventors: Yang Yang, Newton, MA (US); Zubing Robin Qin, Southborough, MA (US)

(73) Assignee: CA, Inc., New York, NY (US)

(*) Notice: Subject to any disclaimer, the term of this patent is extended or adjusted under 35 U.S.C. 154(b) by 289 days.

(21) Appl. No.: 15/199,715

(22) Filed: Jun. 30, 2016

(65) Prior Publication Data

US 2018/0006873 A1 Jan. 4, 2018

(51) Int. Cl.
*H04L 12/24* (2006.01)
*H04L 12/26* (2006.01)

(52) U.S. Cl.
CPC ...... *H04L 41/0853* (2013.01); *H04L 41/0213* (2013.01); *H04L 43/08* (2013.01); *H04L 41/12* (2013.01)

(58) Field of Classification Search
CPC .............................. H04L 41/046; H04L 41/12
See application file for complete search history.

(56) References Cited

U.S. PATENT DOCUMENTS

| 7,752,301 | B1* | 7/2010 | Maiocco | G06F 15/173 709/224 |
| 8,078,706 | B1* | 12/2011 | Raveendran | H04L 41/0853 709/220 |
| 8,417,688 | B2* | 4/2013 | Abbondanzio | H04L 41/0856 707/713 |
| 2005/0278692 | A1* | 12/2005 | Sridhar | G06F 8/20 717/106 |
| 2006/0242284 | A1* | 10/2006 | Savage | H04L 41/046 709/223 |
| 2013/0346574 | A1* | 12/2013 | Singaraju | H04L 41/046 709/223 |

* cited by examiner

*Primary Examiner* — Philip J Chea
*Assistant Examiner* — Robert B McAdams
(74) *Attorney, Agent, or Firm* — Gilliam IP PLLC

(57) ABSTRACT

Although MIB extensions allow for access to a rich dataset about a variety of SNMP-enabled devices, utilizing the rich dataset for various management tasks can involve collection of a vast amount of data from an SNMP-enabled device. For instance, a network management system may collect several tables of utilization data for thousands of interfaces divided into multiple sets of interfaces on an SNMP-enabled device to calculate the average utilization of a single group of interfaces. Moreover, the values for some OIDs are other OIDs. In at least these cases, the conventional request-response exchange for data collection is insufficient. Expressions can be written with in an expression languages as data collection queries ("embedded queries") for interactive querying over multiple exchanges for SNMP data collection.

20 Claims, 3 Drawing Sheets

VARIABLE SNMP DATA COLLECTION WITH EMBEDDED QUERIES

BACKGROUND

The disclosure generally relates to the field of data processing, and more particularly to network management data collection.

A management information base (MIB) for network management is a formal, hierarchical description of network objects that can be managed by a network management system that, for example, implements the Simple Network Management Protocol (SNMP). In a MIB, object identifiers (OIDs) have been assigned various entities across multiple levels and the entities have been named. These entities include managed resources, also referred to as managed objects. A managed object may be a device, a device attribute, a device component, etc. The Internet Engineering Task Force has defined the MIB specifications, MIB-1 and MIB-2. In addition to these specifications, private entities (e.g., device vendors) define MIB specification extensions with OIDs specific to their devices.

A management database (MDB), which is an implementation of a MIB, includes leaf nodes that resolve to scalar values or arrays of scalar values. A network management system or network manager can send GET requests to SNMP-enabled devices for specified OIDs input into the network management system. An OID may be an index to a device definition, a device attribute, a 2 dimensional array of managed objects, etc. SNMP-enabled devices provide responses with the values corresponding to the requested OIDs. This request-response exchange may be referred to as SNMP data collection.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to the MVFLEX expression language ("MVEL") in illustrative examples. But aspects of this disclosure can be use other expression languages for embedded queries, such as the OGNL language. In other instances, well-known instruction instances, protocols, structures and techniques have not been shown in detail in order not to obfuscate the description.

Overview

Although MIB extensions allow for access to a rich dataset about a variety of SNMP-enabled devices, utilizing the rich dataset for various management tasks can involve collection of a vast amount of data from an SNMP-enabled device. For instance, a network management system may collect several tables of utilization data for thousands of interfaces divided into multiple sets of interfaces on an SNMP-enabled device to calculate the average utilization of a single group of interfaces. Moreover, the values for some OIDs are other OIDs. In at least these cases, the conventional request-response exchange for data collection is insufficient. Expressions to calculate values from the data collection can be written with in an expression languages as data collection queries ("embedded queries") for interactive querying over multiple exchanges for SNMP data collection.

Example Illustrations

Figure 1:
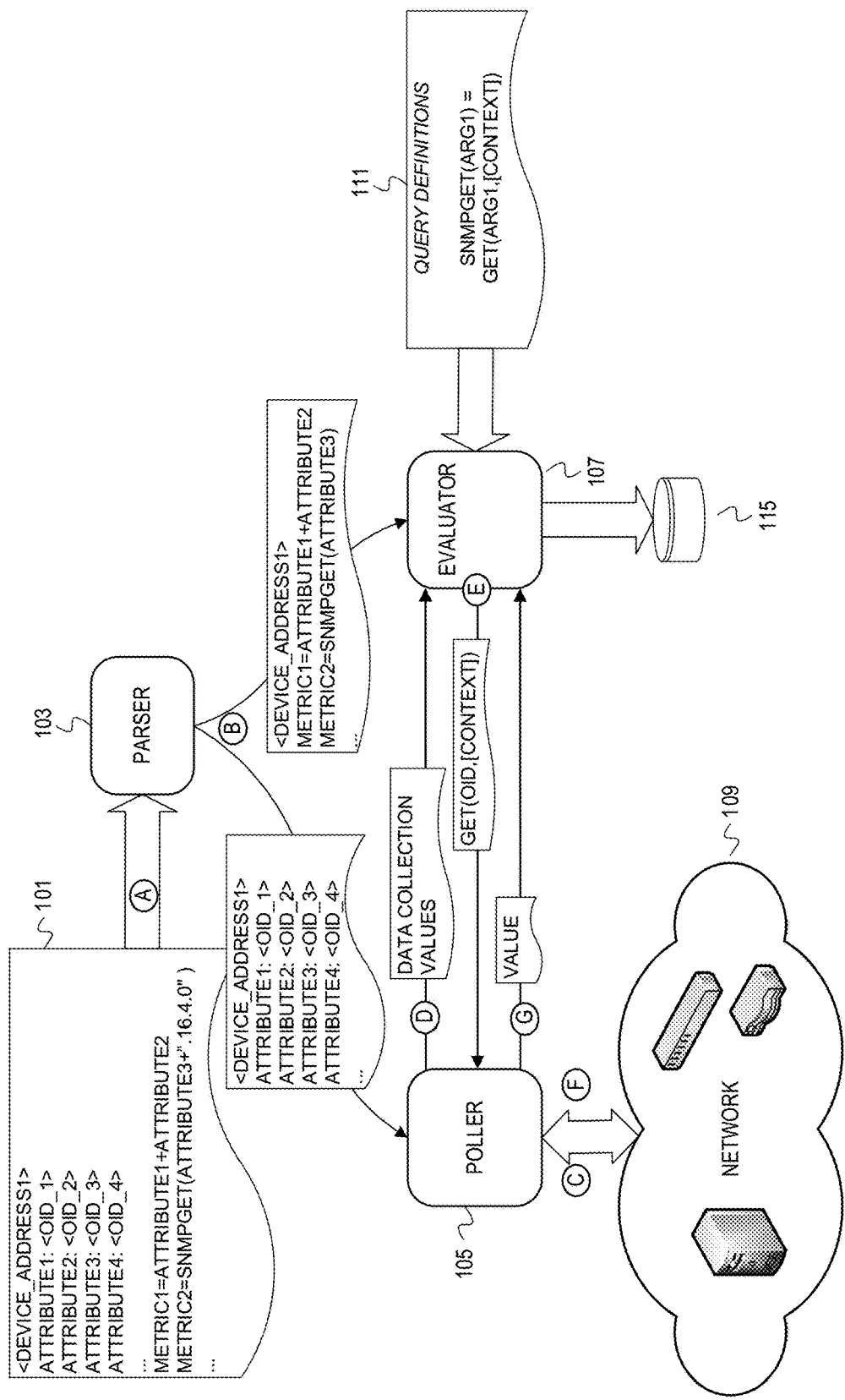
FIG. 1 depicts an example illustration of a variable SNMP data collection with an embedded query.

FIG. 1 depicts an example illustration of a variable SNMP data collection with an embedded query. Based on knowledge about attributes defined in MIBs, an SNMP data collection configuration file, sometimes referred to as a certification file, can be defined to collect attribute values. An entity can also specify expressions for computing values for various management metrics based on the collected attribute values. These expressions are referred to herein as "metric expressions." FIG. 1 depicts an SNMP data collection configuration file ("configuration file") 101. Elements of a network management system process the configuration file 101 for variable SNMP data collection, and evaluate metric expressions that use the collected attribute values. A metric expression may compute a metric value with a variable attribute value. For instance, a metric expression may compute average idle time for the busiest processors of routers in a managed network. An MIB may define an OID that identifies the busiest processor on a router. To collect the idle times for those processors, the management system will first collect the OIDs of these busiest processors, and then utilize the collected OIDs to query for idle times. In FIG. 1, depicted elements of an example network management system include a parser 103, a poller 105, and an evaluator 107. The network management system elements manage and monitor components of a network 109, which can include software components and hardware components.

FIG. 1 is annotated with a series of letters A-G. These letters represent stages of operations, each of which may be one operation or multiple operations. Although these stages are ordered for this example, the stages illustrate one example to aid in understanding this disclosure and should not be used to limit the claims. Subject matter falling within the scope of the claims can vary with respect to the order and some of the operations.

At stage A, the parser 103 parses the configuration file 101 to separate metric expressions from a list of attribute values to be collected in an SNMP data collection. This illustration depicts a configuration file with both metric expressions and an attribute list. The attribute list assigns attribute variables to OIDs. For instance, ATTRIBUTE1 is assigned to OID_1. FIG. 1 depicts the OIDs with the semantic <OID_#> instead of an actual OID which is lengthy and not easily readable (e.g., ".1.3.6.1.4.1.2021.11.53.0" is the Linux OID for raw idle cpu time). The configuration file 101 further includes metric expressions. A metric expression "METRIC2" is "SNMPGET(ATTRIBUTE3+".16.4.0")." The attribute variable "ATTRIBUTE3" is assigned to OID_3. The illustration presumes that OID_3 resolves to another OID. Therefore, the metric expression METRIC2 includes an embedded query to collect the attribute value of the OID to which OID_3 resolves. For instance, the OID_3 value may identify the interface with a greatest amount of outgoing traffic. The METRIC2 expression may modify (append appropriate branch identifiers) that OID to obtain the number of outgoing bytes for the interface identified by OID_3. The parser 103 may separate the metric expressions from the attribute list based on a dividing delimiter within the configuration 101 (e.g., a dividing character or string), header information of the configuration file (e.g., offset locations), or recognizing semantic differences between expressions and variable assignments. Although other techniques are possible, the configuration file 101 specifies a device address (e.g., Internet Protocol address) before each group of attribute values to be collected. FIG. 1 only depicts a single device address, DEVICE_ADDRESS1 in the configuration file 101. Other device addresses can be specified in the configuration file 101 or configuration files can be defined per device address. In addition, devices for data collection may be identified by a device identifier that resolves to a device profile that comprises information for establishing a session with the device (e.g., environment variables) for data collection.

At stage B, the parser 103 passes the list of attributes for data collection to the poller 105 and passes the metric expressions to the evaluator 107. The parser 103 may reformat the list of attributes for passing as input into the poller 105. The parser 103 may invoke poller program code and pass the list of attributes as arguments in the invocation. The parser 103 may pass to the poller 105 the list of attributes as a Java object, such as a Java object. Similarly, the parser 103 may pass the metric expressions to the evaluator 107 in a message, in a buffer, as a file, or by reference.

At stage C, the poller 105 performs data collection for the list of attributes from the parser 103. The poller 105 submits queries (e.g., GET commands) to the SNMP managed devices of the network 109. The poller 105 traverses the attribute list and forms the queries from each of the OIDs. When the corresponding values are returned, the poller 105 assigns the returned values to the corresponding attribute variables. For instance, the poller 105 will assign the value returned for OID_1 to the variable ATTRIBUTE1.

At stage D, the poller 105 provides the data collection values to the evaluator 107. The poller 105 may provide the data collection values to the evaluator 107 as each value is received, in batches, and/or after completion of the data collection for the attribute list.

At stage E, the evaluator 107 evaluates the metric expressions from the parser 103 and invokes embedded queries for dynamic data collection. With query definitions 111, the evaluator 107 determines a query definition for the embedded query SNMPGET(ATTRIBUTE3+".16.4.0"). According to the definition, this embedded query is implemented as GET(ARG1, [CONTEXT]), which can be a function written in the Java® programming language for example. Based on the definition, ATTRIBUTE3+".16.4.0" maps to ARG1, The semantic [CONTEXT] is used to identify a set of context parameters for the data collection implemented for the embedded query. The context parameters include static arguments, such as an SNMP version. The context parameters may also include dynamic arguments, such as a network address for a particular device. If a particular network address is to be used for the data collection, then the evaluator 107 can determine the network address for the context parameters based on information specified for a corresponding device. For instance, a device profile can be defined for each type of device and/or each device. The device profile specifies various information, such as environment variables, to establish a session with the corresponding device and collect the attribute data for the embedded query. The evaluator can determine the corresponding device with session information of the preceding data collection. The context parameters may be indicated in an object passed to the evaluator. The evaluator 107 then invokes the implementation of the embedded query with the mapped arguments. If the poller 105 manages multiple queries (e.g., multi-threaded polling across different SNMP managed devices and/or across different components), then the poller 105 can manage the invoked query.

At stage F, the poller 105 queries the managed device identified in the invoked query implementation. After collecting the attribute value of the OID in the invoked GET, the poller 105 returns the value to the evaluator 107 at stage G. With the returned value, the evaluator 107 can evaluate the metric expression METRIC2. Afterwards, the metric values can be stored in a management database 115.

Although FIG. 1 depicts a configuration file with both metric expressions and attribute values to be collected, this is not necessary. Attribute values to be collected can be specified separately from metric expressions in different files, different database entries, different datasets, etc. To bind attribute variables to the appropriate metric expressions, different techniques can be used. As examples, globally unique variables can be used; attribute variables and metric expressions can be related by network address; etc.

Figure 2:
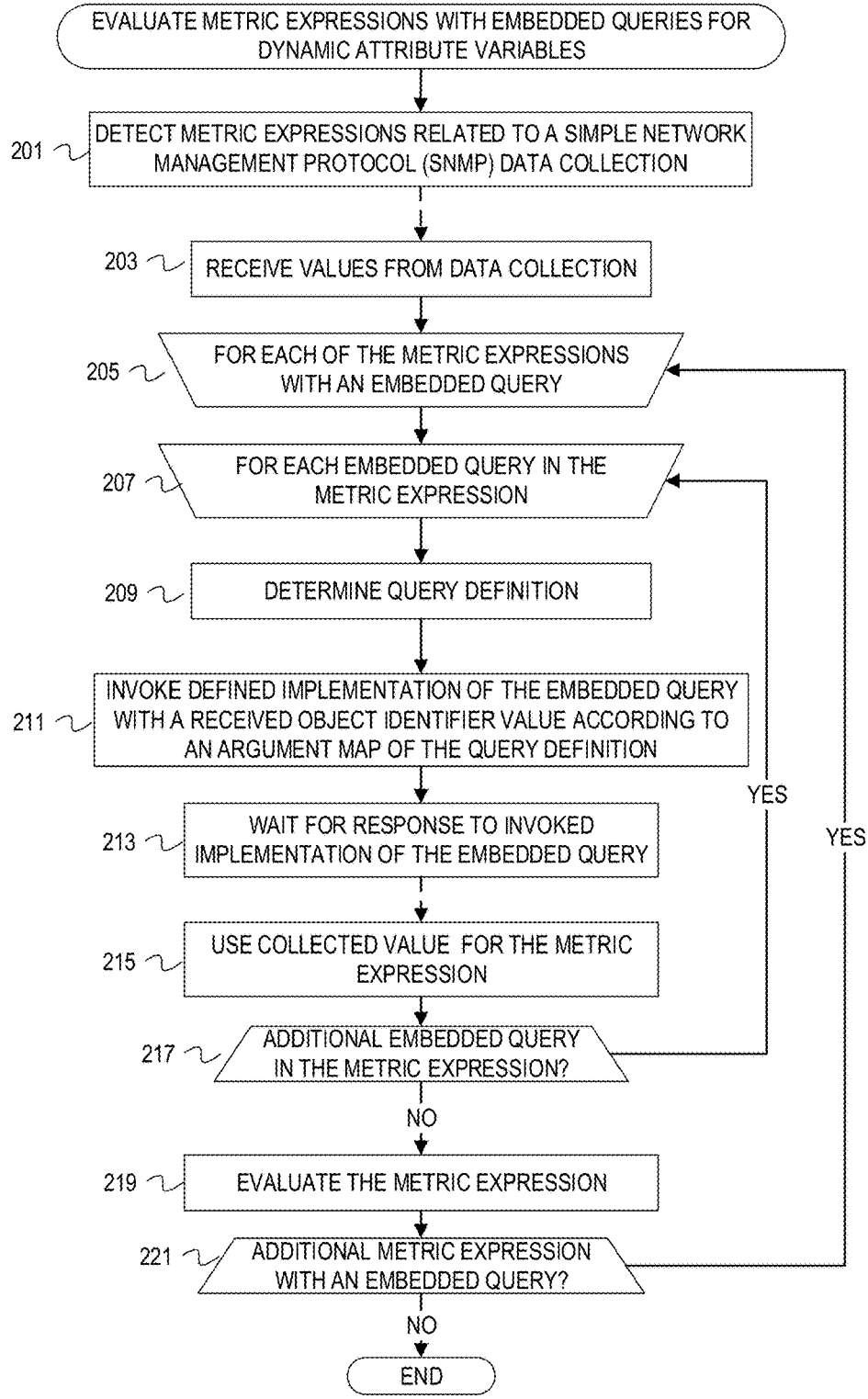
FIG. 2 is a flowchart of example operations for evaluating metric expressions with embedded queries for dynamic attribute variables.

FIG. 2 is a flowchart of example operations for evaluating metric expressions with embedded queries for dynamic attribute variables. The description FIG. 2 refers to an evaluator as performing the example operations for consistency with FIG. 1. FIG. 2 includes dashed arrows to depict asynchronous operations that typically relate to waiting for a result or value.

An evaluator detects a set of metric expressions related to an SNMP data collection (201). As already mentioned, the metric expressions can be related by network address, configuration file identifier, etc. The evaluator may detect an object with the metric expressions. In some embodiments, the evaluator may receive the metric expressions in a message (e.g., inter-process communication message), via a buffer, as arguments in a function/method invocation, etc. Prior to or concurrently with receipt of the metric expressions, SNMP data collection of attribute values related to the metric expressions occurs. The evaluator will receive the values from the SNMP data collection and apply the received values to evaluate the metric expressions (203).

After receipt of the values, the evaluator examines the metric expressions to determine whether any have an embedded query (205). The evaluator can traverse the metric expressions as arranged when received, evaluating each in order. The evaluator can examine the metric expressions in a first pass to determine if any have embedded expressions. If some form of concurrent processing is available (e.g., multiple processing cores and/or multi-threading), the evaluator can evaluate expressions that do not have embedded queries and concurrently evaluate those with embedded queries.

For each metric expression with an embedded query, the evaluator processes each embedded query (207). To process an embedded query, the evaluator determines a query definition (209). The embedded query can be written in a dynamic expression programming language, such as the MVEL programming language. Query definitions can be written for any of the SNMP data collection commands (e.g., get, walk, bulkwalk, table, etc.) in the MVEL programming language. The evaluator determines an implementation of the embedded query (e.g., a Java programming language implementation of the SNMP command). The evaluator will invoke an instance of the implementation to carry out the embedded query. Before invoking, the evaluator also ascertains other arguments for the implementation to instantiate the implementation with the arguments. The query definition defines an argument map to guide injection of arguments from the embedded query into the implementation instance. The embedded query will include an attribute variable. With the data collection values, the evaluator can determine the collected OID corresponding to the attribute variable of the embedded query and use the collected OID assigned to the attribute variable in the implementation instance. In addition to any collected OID being queried, the evaluator injects context parameters into the implementation instance as mentioned above. After injecting the arguments, the evaluator invokes the implementation instance of the embedded query with the collected OID and the context parameters (211). The evaluator then waits for a response to the invoked implementation instance (213).

After receipt of a value collected for the OID indicated in the invoked implementation instance, the evaluator uses the collected value for the metric expression (215). The evaluator may load the collected value for eventual evaluation of the metric expression if there are other values to collect for the metric expression. The evaluator may replace or substitute the embedded query with the collected value. If there is an additional unresolved embedded query in the metric expression, then the evaluator proceeds to process that embedded query (217). Otherwise, the evaluator evaluates the metric expression with the collected value(s) (219).

After evaluation of the metric expression, the evaluator proceeds to examine the next metric expression if another remains (221). At any point during or after evaluation of metric expressions according to design, the evaluator can pass computed metric values to a management system for presenting via a user interface, storing, and/or further processing.

Variations

The example illustrations can be examined for concurrency optimization across metric expressions. Embodiments can determine dependencies across metric expressions to avoid blocking interactive data collection of independent attribute values in an environment with concurrent processing capabilities. In cases of a metric expression with multiple embedded queries, the implementations of the embedded queries can be invoked in parallel if the attribute variables being collected are independent. Across metric expressions, embodiments can determine dependencies of metric values as well as attribute variables. For instance, a metric expression may use a metric value from another metric expression, thus a metric value dependency exists.

Although the embedded queries allow for interactive data collection of dynamic attribute variables, the embedded queries also allow for efficient adaptation to changes in MIB sub-trees. For example, an administrator may wish to present average traffic (bytes in and out) on the least busy interfaces of monitored routers. To do this, the network management system collected traffic data for all interfaces for all of the monitored routers. Metric expressions then effectively sifted through this data to determine the least busy interfaces of each router to finally compute the average amount of traffic on these least busy interfaces. New OIDs are then defined for the routers that resolves to an identifier of the least busy interface in a 3 different time windows. The SNMP data collection configuration file can be reduced to collecting the OID for the desired time window metric expressions with embedded queries for the traffic statistics for the interfaces that will be identified from the SNMP data collection. Not only has the collection configuration been reduced, but the amount of management traffic has been significantly reduced with the embedded queries.

The examples often refer to an "evaluator." The evaluator is a construct used to refer to implementation of functionality for hooking an embedded query in an expression language into a defined implementation of the query for interactive SNMP data collection. This construct is utilized since numerous implementations are possible. An evaluator can be given any moniker depending on platform, programming language, programmer preference, etc. In addition, the functionality attributed to an "evaluator" can be distributed across different components, whether software or hardware components. For instance, invoking implementation instances of embedded queries may be done with a software component while evaluation of a metric expression with collected data may be performed by arithmetic hardware components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, an evaluator can move on to the example operation represented by block 217 and avoid 213 if the metric expression does not have a blocking dependency. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 3:
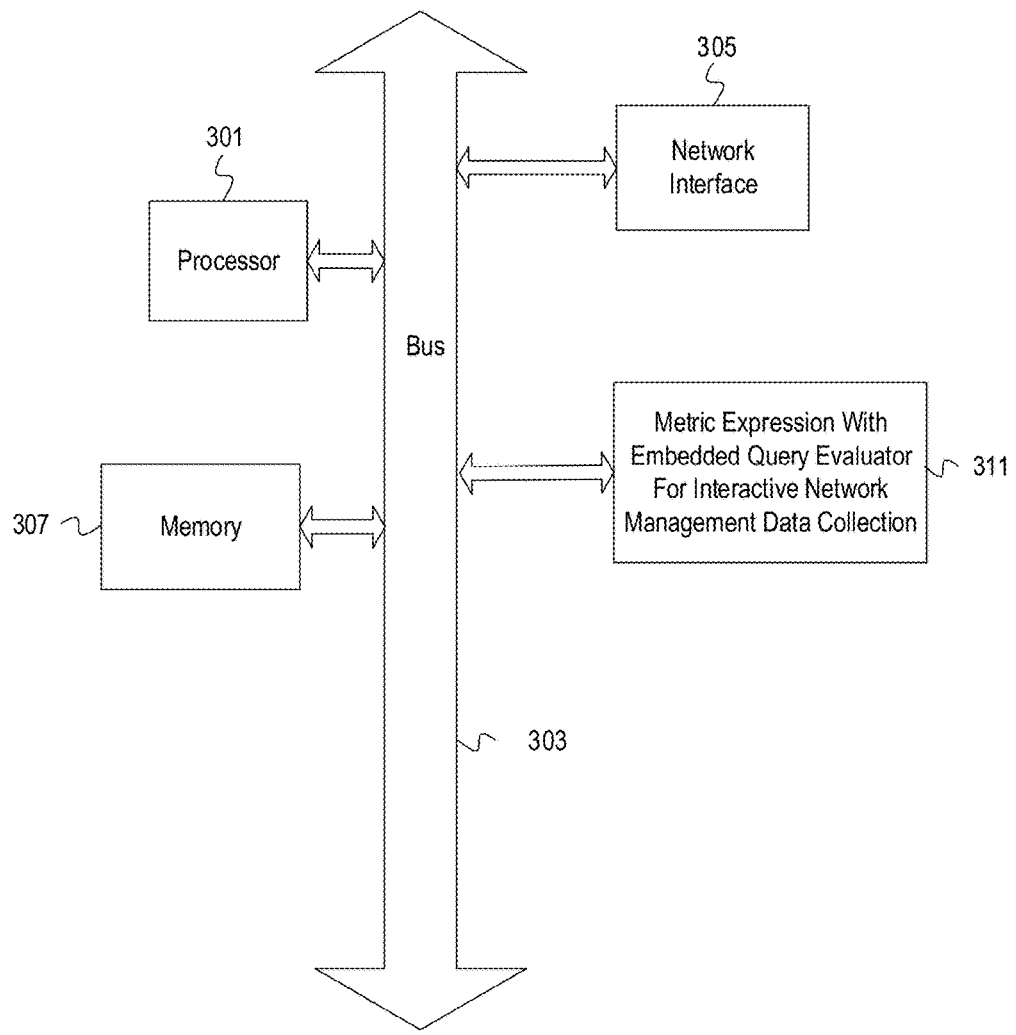
FIG. 3 depicts an example computer system with a metric expression evaluator for interactive network management data collection.

FIG. 3 depicts an example computer system with a metric expression evaluator for interactive network management data collection. The computer system includes a processor 301 (possibly including multiple processors, multiple cores, multiple nodes, and/or implementing multi-threading, etc.). The computer system includes memory 307. The memory 307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 303 (e.g., PCI, ISA, PCI-Express, HyperTransport® bus, InfiniBand® bus, NuBus, etc.) and a network interface 305 (e.g., a Fiber Channel interface, an Ethernet interface, an internet small computer system interface, SONET interface, wireless interface, etc.). The system also includes an evaluator 311. The evaluator 311 evaluates metric expressions with embedded queries for interactive network management data collection. The evaluator determines a defined query implementation for a query embedded in a network metric expression. The embedded query relates to a network management data collection and specifies at least one attribute variable. The evaluator 311 substitutes a collected OID for the attribute variable for the embedded query when invoking an implementation instance of the embedded query. Any one of the previously described functionalities may be partially (or entirely) implemented in hardware and/or on the processor 301. For example, the functionality may be implemented with an application specific integrated circuit, in logic implemented in the processor 301, in a co-processor on a peripheral device or card, etc. Further, realizations may include fewer or additional components not illustrated in FIG. 3 (e.g., video cards, audio cards, additional network interfaces, peripheral devices, etc.). The processor 301 and the network interface 305 are coupled to the bus 303. Although illustrated as being coupled to the bus 303, the memory 307 may be coupled to the processor 301.

While the aspects of the disclosure are described with reference to various implementations and exploitations, it will be understood that these aspects are illustrative and that the scope of the claims is not limited to them. In general, techniques for embedded query driven interactive SNMP data collection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   after receipt of values from a simple network management protocol (SNMP) data collection based, at least in part, on a plurality of object identifiers,
   determining that a first metric expression of a plurality of metric expressions comprises an embedded query for a first device attribute, wherein the plurality of metric expressions relates to the plurality of object identifiers;
   identifying from the values a first value collected for the first device attribute, wherein the first value is a first object identifier;
   resolving the embedded query to an implementation of the embedded query;
   instantiating the implementation of the embedded query with the first object identifier and SNMP data collection parameters as arguments according to an argument map;
   invoking the instantiated implementation of the embedded query; and
   upon receipt of a response to the invoked implementation instance, evaluating the first metric expression with a second value from the response.

2. The method of claim 1 further comprising:
   parsing an input that indicates the plurality of object identifiers and corresponding device attributes and that indicates the plurality of metric expressions;
   extracting the plurality of metric expressions from the input; and supplying the input without the metric expressions for the SNMP data collection.

3. The method of claim 1, wherein the embedded query is an MVEL query that resolves to the embedded query implementation.

4. The method of claim 1, wherein the SNMP data collection parameters comprise an SNMP version and a device address.

5. The method of claim 4, further comprising determining the device address from an input that indicates the first device attribute and the first metric expression are related to the device address.

6. The method of claim 1 further comprising supplying for network management a plurality of metrics computed from the plurality of metric expressions.

7. The method of claim 1 further comprising:
determining dependencies among the plurality of metric expressions; and
evaluating the plurality of metric expressions based, at least in part, on determined dependencies.

8. The method of claim 1, wherein the first device attribute is represented with a first variable in the embedded query and the first value has been assigned to the first variable from the SNMP data collection.

9. One or more non-transitory machine-readable media comprising program code for interactive simple network management protocol (SNMP) data collection, the program code to:
identify among a plurality of metric expressions those that comprise embedded queries for device attributes, the plurality of metric expressions corresponding to a listing of object identifiers;
after receipt of values from an SNMP data collection based, at least in part, on the listing of object identifiers,
identify among the values those that are object identifiers corresponding to device attributes of the embedded queries;
determine SNMP data collection parameters for collecting data from a managed device corresponding to the device attributes;
for each of the embedded queries,
resolve the embedded query to an implementation of the embedded query;
instantiate the implementation of the embedded query with a corresponding one or more of the object identifiers and the SNMP data collection parameters as arguments;
invoke the instantiated implementation of the embedded query; and
upon receipt of a response to the invoked implementation instance, evaluate a corresponding one of the identified metric expression utilizing a second value from the response.

10. The non-transitory machine-readable media of claim 9, further comprising program code to:
evaluate the plurality of metric expressions in a defined order, wherein the program code to evaluate the plurality of metric expressions comprises program code to halt evaluation until receipt of a response.

11. The non-transitory machine-readable media of claim 9 further comprising program code to:
determine metric expressions of the plurality of metric expressions that are dependent on metric expressions of the plurality of metric expressions that have embedded queries; and
evaluate the plurality of metric expressions based, at least in part, on determined dependencies.

12. The non-transitory machine-readable media of claim 9, wherein the program code to determine the SNMP data collection parameters comprises the program code to determine the data collection parameters from a device profile associated with the SNMP data collection.

13. The non-transitory machine-readable media of claim 9, wherein the data collection parameters comprise a device address.

14. An apparatus comprising:
a processor; and
a machine-readable medium comprising program code executable by the processor to cause the apparatus to,
after receipt of values from a simple network management protocol (SNMP) data collection based, at least in part, on a plurality of object identifiers,
determine that a first metric expression of a plurality of metric expressions comprises an embedded query for a first device attribute, wherein the plurality of metric expressions relates to the plurality of object identifiers;
identify from the values a first value collected for the first device attribute, wherein the first value is a first object identifier;
resolve the embedded query to an implementation of the embedded query;
instantiate the implementation of the embedded query with the first object identifier and SNMP data collection parameters as arguments according to an argument map;
invoke the instantiated implementation of the embedded query; and
upon receipt of a response to the invoked implementation instance, evaluate the first metric expression with a second value from the response.

15. The apparatus of claim 14, wherein the program code further comprises program code to:
parse an input that indicates the plurality of object identifiers and corresponding device attributes and that indicates the plurality of metric expressions;
extract the plurality of metric expressions from the input; and
supply the input without the metric expressions for the SNMP data collection.

16. The apparatus of claim 14, wherein the embedded query is an MVEL query that resolves to the embedded query implementation.

17. The apparatus of claim 14, wherein the SNMP data collection parameters comprise an SNMP version and a device address.

18. The apparatus of claim 17, wherein the program code further comprises program code executable by the processor to cause the system to determine the device address from an input that indicates the first device attribute and the first metric expression are related to the device address.

19. The apparatus of claim 14 wherein the program code further comprises program code executable by the processor to cause the system to supply for network management a plurality of metrics computed from the plurality of metric expressions.

20. The apparatus of claim 14, wherein the program code further comprises program code executable by the processor to cause the system to:
determine dependencies among the plurality of metric expressions; and evaluate the plurality of metric expressions based, at least in part, on determined dependencies.

* * * * *